Dec. 18, 1962     S. C. TABISZ     3,069,561
FLIP-FLOP UTILIZING DIODE COUPLING WHICH DISCONNECTS INPUT
VOLTAGES AFTER TRANSISTION BETWEEN STABLE STATES
Filed June 19, 1959

WITNESSES

INVENTOR
Sylvester C. Tabisz
BY *Maury I. Hull*
ATTORNEY

United States Patent Office 3,069,561
Patented Dec. 18, 1962

3,069,561
FLIP-FLOP UTILIZING DIODE COUPLING WHICH DISCONNECTS INPUT VOLTAGES AFTER TRANSITION BETWEEN STABLE STATES
Sylvester C. Tabisz, Baltimore, Md., assignor to Westinghouse Electric Corporation, East Pittsburgh, Pa., a corporation of Pennsylvania
Filed June 19, 1959, Ser. No. 821,564
14 Claims. (Cl. 307—88.5)

This invention relates to improvements in triggered bistable multivibrators employing transistors, and more particularly to a triggered bistable transistor multivibrator utilizing diode coupling which disconnects the input trigger voltages from the multivibrator after transition between the stable states has taken place.

In summary, the apparatus of the instant invention utilizes two pairs of triode transistors, one transistor of each pair controlling the other and also controlling output to a load device operatively connected thereto. The pairs are alternately conductive. Pulses applied through coupling diodes to the control transistors result in transitions between the two stable states. After the transitions occur, voltages are developed at the control transistors which apply inverse biases to the coupling diodes thereby limiting power consumption from the triggering sources to very short periods of time.

One of the objects of the instant invention is to provide an improved bistable multivibrator employing transistors.

Another object is to provide an improved bistable multivibrator in which the direct current input driving voltage or input trigger is disconnected by rectifier means after transition has taken place.

A further object is to provide a new and improved bistable transistor multivibrator in which driving power requirements are minimized.

Figure 1:
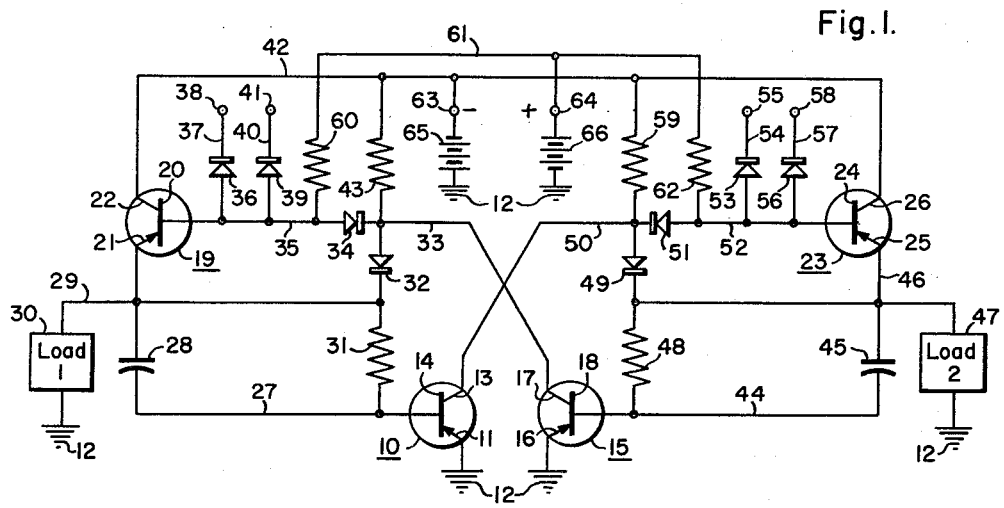
Figure 2:
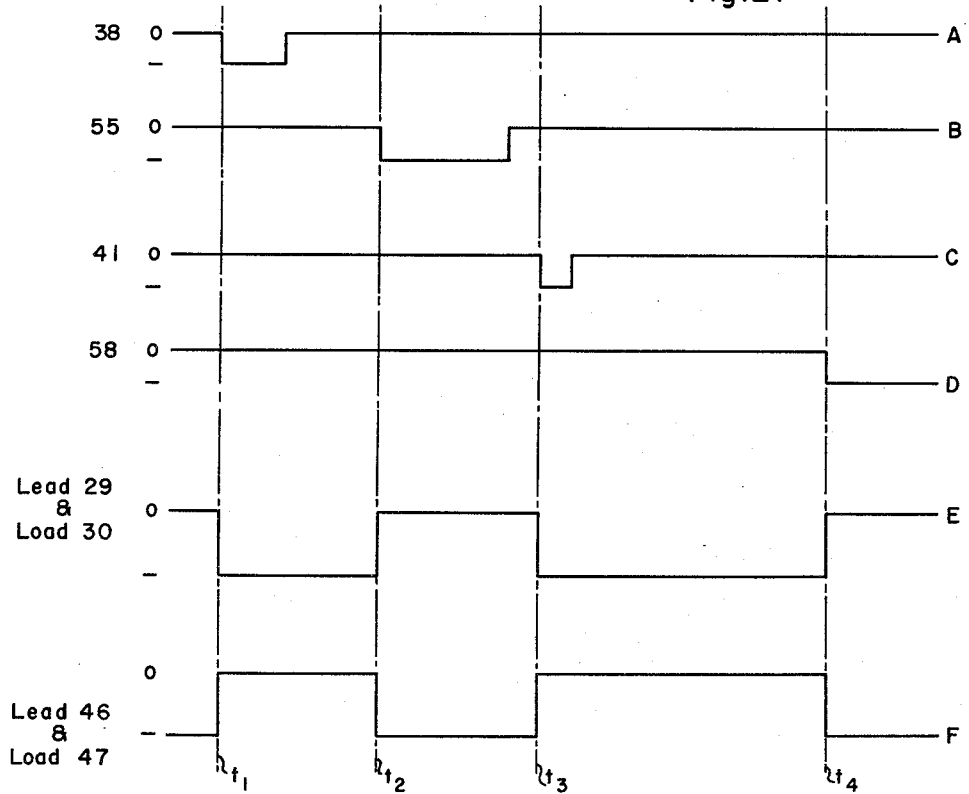

Other objects and advantages will become apparent after a study of the following specification, in which:

FIG. 1 is a schematic circuit diagram of the preferred embodiment of the invention; and FIG. 2 is a graph illustrating the operation of the apparatus of FIG. 1.

Particular reference is made now to FIG. 1, in which there is shown at 10 a transistor of the p-n-p type having an emitter 11 connected to ground 12 and having a collector 13 and base 14. A second transistor of the p-n-p type is generally designated 15 and has an emitter 16 connected to ground 12, a collector 17 and base 18. A third p-n-p transistor is shown at 19 having a base 20, emitter 21, and collector 22, while a fourth p-n-p transistor is shown at 23 having a base 24, emitter 25 and collector 26.

The aforementioned base 14 of transistor 10 is connected by way of lead 27, capacitor 28 and lead 29 to the aforementioned emitter 21 of transistor 19. Lead 29 has load 30 connected therefrom to ground 12. The base 14 is also connected by way of resistor 31, lead 29, rectifier 32, lead 33, rectifier 34 and lead 35 to the aforementioned base 20 of transistor 19. Lead 35 is connected by way of rectifier 36 and lead 37 to trigger input terminal 38, and lead 35 is also connected by way of rectifier 39 and lead 40 to trigger input terminal 41. Lead 35 is further connected by way of resistor 60 and lead 61 to the positive terminal 64 of a suitable source of direct current energizing potential 66. The aforementioned lead 33 is also connected to the aforementioned collector 17 of transistor 15.

Collector 22 of transistor 19 is connected by way of lead 42 to collector 26 of transistor 23. Lead 42 is connected to the negative terminal 63 of a suitable source of direct current energizing potential 65. The aforementioned lead 33 is connected by way of resistor 43 to the aforementioned lead 42.

The base 18 of the aforementioned transistor 15 is connected by way of lead 44, capacitor 45 and lead 46 to the aforementioned emitter 25 of transistor 23. Lead 46 has load 47 connected therefrom to ground 12. The aforementioned lead 44 is connected by way of resistor 48, lead 46, rectifier 49, lead 50, rectifier 51 and lead 52 to the aforementioned base 24 of transistor 23. Aforementioned lead 50 is connected to the aforementioned collector 13 of transistor 10. Lead 52 is connected by way of rectifier 53 and lead 54 to trigger input terminal 55, and lead 52 is also connected by way of rectifier 56 and lead 57 to an additional trigger input terminal 58. The aforementioned lead 50 is connected by way of resistor 59 to the aforementioned lead 42 and the negative terminal 63 of the aforementioned source of direct current potential 65 having the other positive terminal thereof connected to ground 12. The aforementioned lead 52 and base 24 are connected by way of resistor 62 to the aforementioned lead 61 and positive terminal 64. The aforementioned source of direct current energizing potential 66 has the negative terminal thereof connected to ground 12. If desired, sources 65 and 66 may be a single battery with a grounded tap.

In understanding the operation of the circuit of FIG. 1, let it be assumed by way of description that resistors 60 and 62 have similar high resistance values, while resistors 43 and 59 have much lower values of, for example, one kilohm each. Assume further that a negative trigger pulse has just been applied to one of the terminals 55 or 58 causing transistors 23 and 15 to become conductive and transistors 10 and 19 to become non-conductive. This circuit condition may be thought of as the first stable state. Under such conditions lead 52 assumes a negative potential approaching the potential of terminal 63, back-biasing the rectifiers 53 and 56 and cutting off current flow from the trigger source. In this first stable state, current is flowing in load 47 through transistor 23. Current is also flowing from ground 12 through transistor 15, resistor 48, lead 46, and transistor 23.

As a result of transistor 15 being conductive or "on," the collector 17 of transistor 15 and lead 33 are at substantially ground potential. Lead 35 is at only a very slight positive potential due to the voltage drop in diode 34. This very slight positive potential on lead 35 and base 20 back-biases transistor 19, tending to maintain it in a non-conductive condition. Base 14 of transistor 10 is at substantially ground potential because of the connection to lead 33 by way of resistor 31 and diode 32. In other words, transistor 19 being "off," this in turn keeps the base 14 of transistor 10 at almost ground potential and keeps transistor 10 "off." While transistor 10 is "off," the collector 13 thereof assumes the negative voltage of lead 50, which is almost equal to the supply voltage.

Assume now by way of description that a negative trigger or step function voltage with an amplitude less than the voltage on collector 13 of transistor 10 is applied to trigger input terminal 38. It cannot pass through rectifier 34 because it is of the wrong polarity. It is applied to the base 20 of transistor 19, turning the transistor 19 "on." A transient goes through capacitor 28 and turns transistor 10 "on." Thereafter current flows through resistor 31 and base 14. After transistor 10 is turned on, current starts to flow through collector 13, pulling lead 50 toward ground potential, and this shuts off transistor 23 which in turn shuts off transistor 15. Collector 17 rises to the voltage on lead 33, approximately equal to the voltage at terminal 63, and this voltage is applied through diode 34 to lead 35, cutting off diodes 36 and 39. During the aforedescribed sequence, when current starts to flow through resistor 31 and base 14, this helps transistor 15 to get out of the saturated condition.

As aforementioned, as the collector voltage of the collector 17 of transistor 15 rises to and exceeds the input trigger voltage at terminal 38, diode 36 becomes back-biased, in effect disconnecting the driving or triggering voltage from the flip-flop circuit although the direct current input voltage or pulse is still applied to the input terminal 38. When the transistor 23 is turned "off," any capacitive load connected to the emitter 25 of transistor 23 is discharged through diode 49 and the collector 13 of transistor 10 providing a low impedance path to ground. The circuit then assumes a second stable state and remains in this second state until a triggering voltage of the proper amplitude and polarity is applied to one of the input terminals 55 or 58 whereupon the operation is repeated except that the functions of the complementary transistors are reversed and the circuit then reassumes its first stable state. The first stable state is maintained until an input pulse of the correct amplitude and polarity is applied to one of the input terminals 38 or 41.

Particular reference should be made now to FIG. 2 wherein curves A, B, C, and D show the negative input pulses at terminals 38, 55, 41, and 58, respectively. It should be noted that the pulses may be of random duration and that the leading edge of the pulse of curve "A" causes the circuit to "flop," or change from one stable state to the other stable state, at a time $t_1$, in which condition it remains until the leading edge of the pulse at terminal 55, at which time the circuit flip-flops to a second stable condition at a time $t_2$, where it remains until the leading edge of the input pulse at terminal 41 whereupon the circuit at time $t_3$ is restored to its previous condition in which it remains until the leading edge of the pulse at terminal 58, at which time $t_4$ the circuit assumes its other stable state. The curves E and F represent the steady state output signals across the loads 30 and 47, respectively.

By the rectifiers 36 and 39 and their associated input terminals 38 and 41 there has been provided an "or" circuit. In like manner by providing two separate input terminals 55 and 58 isolated from each other by rectifiers 53 and 56 there has been provided an additional "or" circuit, so that the bistable multivibrator may assume either of its two stable states as a result of "or" inputs, that is, one state may result from a signal at either terminal 38 or 41 whereas the other state may result from an input trigger on either terminal 55 or 58.

It should be noted that the pulse widths of curves A, B, C, and D do not represent the times during which flow of current takes place from the trigger source, but may represent the duration of the applied trigger voltages, and that the duration of the flow of the current is very short in each trigger pulse, as previously explained, the rectifiers becoming back-biased after state transition has occurred.

Whereas the transistors of FIG. 1 have been shown as of the p-n-p type, it should be understood that n-p-n transistors could be employed, if desired, by reversing the polarities of the diodes and the voltages, in a manner which will be understood by one skilled in the art.

Loads 30 and 47 may be resistive or capacitive or both to provide current paths from leads 29 and 46 respectively to ground 12.

There has been provided, then, apparatus well suited to accomplish the aforementioned objects of the invention.

Whereas the invention has been shown and described with respect to an embodiment thereof which gives satisfactory results, it should be understood that changes may be made and equivalents substituted without departing from the spirit and scope of the invention.

I claim as my invention:

1. In a bistable transistor multivibrator, in combination, a plurality of transistors including a first transistor, a second transistor, a third transistor, and a fourth transistor, circuit means interconnecting said plurality of transistors, the circuit means including means whereby the third transistor is turned on when the first transistor is turned on and including other means whereby the fourth transistor is turned on when the second transistor is turned on, the circuit means further including a first rectifier connecting the first transistor to the fourth transistor and a second rectifier connecting the second transistor to the third transistor, the multivibrator being in a first stable state while the first transistor is conducting and in a second stable state while the second transistor is conducting, means for applying a first trigger pulse of predetermined amplitude and polarity to the first transistor while the first transistor is non-conducting to render the first and third transistors conductive and through the second rectifier alter the potential on the second transistor in a manner to cause the second transistor to become non-conductive and cause the multivibrator to switch from the second stable state to the first stable state, and means for applying a second trigger pulse of predetermined amplitude and polarity to the second transistor while the second transistor is non-conducting to render the second and fourth transistors conductive and through the first rectifier alter the potential on the first transistor in a manner to cause the first transistor to become non-conductive and to cause the multivibrator to switch from the first stable state to the second stable state.

2. In a bistable transistor multivibrator, in combination, a plurality of transistors including a first transistor and a second transistor, circuit means interconnecting said plurality of transistors, the multivibrator being in a first stable state while the first transistor is conducting and in a second stable state while the second transistor is conducting, means for applying a first trigger pulse of predetermined amplitude and polarity to the first transistor while the first transistor is non-conducting to render the first transistor conductive, said circuit means including a third transistor connected to the first transistor in a manner to have the conductivity thereof controlled by the first transistor and a rectifier connected from the third transistor to the second transistor whereby when the first transistor becomes conductive it causes the second transistor to cease to be conductive and causes the multivibrator to switch from the second stable state to the first stable state, and means for applying a second trigger pulse of predetermined amplitude and polarity to the second transistor while the second transistor is non-conductive to render the second transistor conductive, said circuit means including in addition a fourth transistor connected to the second transistor in a manner to have the conductivity thereof controlled by the second transistor and another rectifier connected from the fourth transistor to the first transistor whereby when the second transistor becomes conductive it causes the first transistor to cease to be conductive and causes the multivibrator to switch from the first stable state to the second stable state.

3. In a bistable transistor multivibrator, in combination, a plurality of transistors including a first transistor, a second transistor, a third transistor, and a fourth transistor, circuit means including energizing means interconnecting said plurality of transistors, the circuit means including means whereby the third transistor is turned on when the first transistor is turned on and including other means whereby the fourth transistor is turned on when the second transistor is turned on, the circuit means further including a first diode connecting the first transistor to the fourth transistor and a second diode connecting the second transistor to the third transistor, the multivibrator being in a first stable state while the first transistor is conducting and in a second stable state while the second transistor is conducting, means including first rectifier means for applying a first trigger pulse of predetermined amplitude and polarity to the first transistor while the first transistor is non-conducting to render the first and third transistors conductive and through the second diode alter the potential on the second transistor in a manner to cause the second transistor to become non-conductive and cause the multivibrator to switch from the second stable state to the first stable state, the circuit means providing for the application of an inverse bias to said first rectifier means which cuts off the flow of current therethrough when the multivibrator switches to the first stable state, and means including second rectifier means for applying a second trigger pulse of predetermined amplitude and polarity to the second transistor while the second transistor is non-conducting to render the second and fourth transistors conductive and through the first diode alter the potential on the first transistor in a manner to cause the first transistor to become non-conductive and cause the multivibrator to switch from the first stable state to the second stable state, the circuit means providing for the application of an inverse bias to said second rectifier means which cuts off the flow of current therethrough when the multivibrator switches to the second stable state.

4. In a bistable transistor multivibrator, in combination, a plurality of transistors including a first transistor and a second transistor, circuit means including first and second rectifier means interconnecting said plurality of transistors, the multivibrator being in a first stable state while the first transistor is conducting and in a second stable state while the second transistor is conducting, means including third rectifier means for applying a first trigger pulse of predetermined amplitude and polarity to the first transistor while the first transistor is non-conductive to render the first transistor conductive, said circuit means being constructed and arranged whereby when the first transistor becomes conductive it causes the second transistor to cease to be conductive and causes the multivibrator to switch from the second stable state to the first stable state, the circuit means providing for the application of an inverse bias through said first rectifier means to said third rectifier means which cuts off the flow of current therethrough when the multivibrator switches to the first stable state, and means including fourth rectifier means for applying a second trigger pulse of predetermined amplitude and polarity to the second transistor while the second transistor is non-conductive to render the second transistor conductive, said circuit means being constructed and arranged whereby when the second transistor becomes conductive it causes the first transistor to cease to be conductive and causes the multivibrator to switch from the first stable state to the second stable state, the circuit means providing for the application of an inverse bias through said second rectifier means to said fourth rectifier means which cuts off the flow of current therethrough when the mutlivibrator switches to the second stable state.

5. A bistable multivibrator comprising, in combination, first transistor means, second transistor means, third transistor means, fourth transistor means, circuit means connecting the first transistor means to the fourth transistor means in a manner whereby while the first transistor means is non-conducting the fourth transistor means is conducting, load means connected to said fourth transistor means and having an output signal developed therein while the fourth transistor means is conducting, said fourth transistor means being operatively connected to said second transistor means and providing a control voltage to said second transistor means which tends to keep said second transistor means conducting, said second transistor means being operatively connected to said third transistor means and while conducting causing a back-biasing potential to be applied to said third transistor means and causing the third transistor means to be non-conductive, said third transistor means being adapted to have a trigger pulse of predetermined polarity and amplitude applied thereto to render the third transistor means conductive, said third transistor means being operatively connected to said first transistor means in a manner whereby when the third transistor means becomes conductive an additional control voltage is applied to the first transistor means to render the first transistor means conductive, and other load means operatively connected to said third transistor means and having an output signal developed therein while the third transistor means is conductive, said first transistor means when it becomes conductive causing a back-biasing potential to be applied to said fourth transistor means thereby rendering said fourth transistor means non-conductive, said fourth transistor means when rendered non-conductive removing the control voltage from the second transistor means thereby causing the second transistor means to become non-conductive, said fourth transistor means being adapted to have an additional trigger pulse of predetermined polarity and amplitude thereafter applied thereto to render said fourth transistor means conductive.

6. A bistable multivibrator comprising, in combination, first transistor means, second transistor means, third transistor means, fourth transistor means, load means connected to said third transistor means, other load means connected to said fourth transistor means, circuit means including a first rectifier connecting said first transistor means to said fourth transistor means whereby while the first transistor means is conductive the fourth transistor means is rendered non-conductive and while the first transistor means is non-conductive the fourth transistor means is normally conductive, other circuit means connecting the second transistor means to the fourth transistor means whereby the fourth transistor means while conductive provides a signal for the second transistor means which tends to maintain the second transistor means in a conductive condition, further circuit means including a second rectifier connecting the second transistor means to the third transistor means in a manner whereby while the second transistor means is conductive the third transistor means is rendered non-conductive and while the second transistor means is non-conductive the third transistor means is normally conductive, still further circuit means connecting the first transistor means to the third transistor means whereby the third transistor means while conductive normally provides a signal to the first transistor means which tends to maintain the first transistor means in a conductive condition, still other circuit means including a third rectifier operatively connected to the third transistor means for applying pulses of predetermined amplitude and polarity to the third transistor means to render the third transistor means conductive, and additional circuit means including a fourth rectifier operatively connected to the fourth transistor means for applying pulses of predetermined polarity and amplitude thereto to render the fourth transistor means conductive, pulses alternately applied to the third transistor means and the fourth transistor means causing the multivibrator to alternately assume two stable states and provide output signals alternately in the first mentioned load means and the other load means.

7. A multivibrator circuit having a first stable state and a second stable state comprising, in combination, first transistor means, second transistor means, third transistor means, fourth transistor means, the circuit being in its second stable state while the first transistor means is non-conducting and the second transistor means is conducting, the circuit being in its first stable state while the first transistor means is conducting and the second transistor means is non-conducting, circuit means including a first rectifier connecting the first transistor means to the fourth transistor means whereby while the first transistor means is conducting the fourth transistor means is rendered non-conducting and while the first transistor means is non-conducting the fourth transistor means is conducting, said fourth transistor means being operatively connected to the second transistor means and supplying a control voltage to the second transistor means which tends to maintain the second transistor means in a conducting condition, load means connected to the fourth transistor means and having an output signal developed therein while the fourth transistor means is conducting, other circuit means including a second rectifier connecting the second transistor means to the third transistor means in a manner whereby while the second transistor means is conducting the third transistor means is rendered non-conducting and while the second transistor means is non-conducting the third transistor means is conducting, said third transistor means being connected to the first transistor means in a manner whereby while the third transistor means is conducting an additional control voltage is applied to the first transistor means which tends to maintain the first transistor means in a conducting condition, other load means connected to the third transistor means and having an output signal developed therein while the third transistor means is conducting, additional circuit means including a third rectifier connected to the third transistor means for while the third transistor means is non-conductive applying a trigger pulse of predetermined amplitude and polarity to the third transistor means to render the third transistor means conductive, and further circuit means including a fourth rectifier connected to the fourth transistor means for while the fourth transistor means is non-conductive applying a trigger pulse of predetermined amplitude and polarity to the fourth transistor means to render the fourth transistor means conductive, the trigger pulses applied to the third transistor means causing the circuit to change from the second stable state to the first stable state and the trigger pulses applied to the fourth transistor means causing the circuit to change from the first stable state to the second stable state.

8. A bistable multivibrator circuit comprising, in combination, first transistor means which is conductive while the multivibrator circuit is in a first stable state and non-conductive while the multivibrator circuit is in a second stable state, second transistor means which is non-conductive while the multivibrator circuit is in said first stable state and conductive while the multivibrator circuit is in said second stable state, first transistor control means connected to the first transistor means, second transistor control means connected to the second transistor means, circuit means interconnecting the first transistor means, second transistor means, first control means, and second control means, first and second load means connected to the first and second transistor control means respectively and having output signals provided therein respectively while the first and second transistor control means are conducting, other circuit means connected to the first transistor control means for applying a trigger pulse of predetermined polarity and amplitude to the first transistor control means, said trigger pulse being applied while the first transistor control means is non-conductive and causing the first transistor control means to become conductive and thereby switch the multivibrator circuit from the second stable state to the first stable state, and additional circuit means for applying a trigger pulse of predetermined polarity and amplitude to the second transistor control means while the second transistor control means is non-conductive to thereby render the second transistor control means conductive and switch the circuit from the first stable state to the second stable state.

9. A bistable multivibrator comprising, in combination, a first transistor, a second transistor, a third transistor, a fourth transistor, a source of direct current potential, circuit means interconnecting said source and all said transistors and including a voltage dropping path through the first transistor for obtaining a first variable control potential, the circuit means including a unidirectional current path between the first transistor and the fourth transistor for applying the first variable control potential to the fourth transistor to control the operation thereof, said circuit means also including a voltage dropping path through the second transistor for obtaining a second variable control potential, the circuit means including a unidirectional current path between the second transistor and the third transistor for applying the second variable control potential to the third transistor for controlling the operation of the third transistor, other circuit means connected to the third and fourth transistors for alternately applying trigger pulses thereto of predetermined polarity and amplitude while the third and fourth transistors are non-conductive to render the third and fourth transistors conductive, and additional circuit means connecting the first and second transistors to the third and fourth transistors respectively, said circuit means and additional circuit means providing for transition of the bistable multivibrator between two stable states alternately in accordance with the application of said trigger pulses to the third and fourth transistors.

10. A bistable multivibrator circuit having a first stable state and a second stable state comprising, in combination, a plurality of transistors including a first transistor and a second transistor, first and second loads connected to the first and second transistors respectively, circuit means including energizing means interconnecting said plurality of transistors and said first and second loads, first triggering means including first rectifier means connected to the circuit means at a first circuit point adjacent the first transistor, second triggering means including second rectifier means connected to the circuit means at a second circuit point adjacent the second transistor, pulses of predetermined amplitude and polarity applied to the first triggering means causing the multivibrator circuit to assume a first stable state, and pulses of predetermined amplitude and polarity applied to the second triggering means causing the multivibrator circuit to assume said second stable state, means in the circuit means for causing the energizing means to apply an inverse biasing potential to the first rectifier means while the circuit is in one stable state to prevent the further flow of current through the first rectifier means, and means in the circuit means for causing the energizing means to apply an inverse biasing potential to the second rectifier means while the circuit is in the other stable state to prevent the further flow of current through the second rectifier means.

11. A multivibrator according to claim 3 wherein the first rectifier means is additionally characterized as including a first pair of rectifiers which may selectively conduct the first trigger pulse and the second rectifier means is additionally characterized as including a second pair of rectifiers which may selectively conduct the second trigger pulse.

12. A bistable multivibrator comprising, in combination, first, second, third, and fourth transistors each having a base, collector, and emitter, the multivibrator having a first stable state while the first and third transistors are on and the second and fourth transistors are off, the multivibrator having a second stable state while the second and fourth transistors are on and the first and third transistors are off, circuit means including energizing means for all the transistors, the emitters of the third and fourth transistors being connected to a common circuit point, a first load connected from the emitter of the first transistor to said common circuit point, a second load connected from the emitter of the second transistor to said common circuit point, a first rectifier connecting the base of the first transistor to the collector of the fourth transistor, a second rectifier connecting the base of the second transistor to the collector of the third transistor, first rectifier means connected to the base of the first transistor, said first rectifier means having a predetermined polarity with respect to the polarity of the first rectifier whereby a pulse passing through the first rectifier means is blocked by the first rectifier, second rectifier means connected to the base of the second transistor, said second rectifier means having a predetermined polarity with respect to the polarity of the second rectifier whereby a pulse passing through the second rectifier means is blocked by the second rectifier, other circuit means connecting the first transistor to the third transistor whereby when the first transistor is turned on a transient is applied through said other circuit means to the third transistor in a manner to turn the third transistor on, and additional circuit means connecting the second transistor to the fourth transistor whereby when the second transistor is turned on a transient is applied through said additional circuit means to the fourth transistor to turn the fourth transistor on, a pulse of predetermined polarity applied to the first rectifier means while the first transistor is off varying the base potential on the first transistor and turning the first transistor on thereby turning the third transistor on, the flow of current through the third transistor causing the collector thereof to approach the potential of the common circuit point which through the second rectifier changes the potential on the base of the second transistor in a manner which cuts the second transistor off and thereby cuts the fourth transistor off thereby causing the multivibrator to assume its first stable state, a pulse of predetermined polarity thereafter applied to the second rectifier means while the second transistor is off varying the base potential on the second transistor and turning the second transistor on thereby turning the fourth transistor on, the flow of current through the fourth transistor causing the collector thereof to approach the potential of the common circuit point which through the first rectifier changes the potential on the base of the first transistor in a manner which cuts the first transistor off and thereby cuts the third transistor off thereby causing the multivibrator to assume its second stable state.

13. A bistable multivibrator comprising, in combination, first, second, third and fourth transistors each having a base, collector, and emitter, the multivibrator having a first stable state while the first and third transistors are on and the second and fourth transistors are off, the multivibrator having a second stable state while the second and fourth transistors are on and the first and third transistors are off, circuit means including energizing means for all the transistors, the emitters of the third and fourth transistors being connected to a common circuit point, a first load connected from the emitter of the first transistor to said common circuit point, a second load connected from the emitter of the second transistor to said common circuit point, a first rectifier connecting the base of the first transistor to the collector of the fourth transistor, a second rectifier connecting the base of the second transistor to the collector of the third transistor, first rectifier means connected to the base of the first transistor, said first rectifier means having a predetermined polarity with respect to the polarity of the first rectifier whereby a pulse passing through the first rectifier means is blocked by the first rectifier, second rectifier means connected to the base of the second transistor, said second rectifier means having a predetermined polarity with respect to the polarity of the second rectifier whereby a pulse passing through the second rectifier means is blocked by the second rectifier, other circuit means connecting the first transistor to the third transistor whereby when the first transistor is turned on a transient is applied through said other circuit means to the third transistor in a manner to turn the third transistor on, and additional circuit means connecting the second transistor to the fourth transistor whereby when the second transistor is turned on a transient is applied through said additional circuit means to the fourth transistor to turn the fourth transistor on, a pulse of predetermined polarity applied to the first rectifier means while the first transistor is off varying the base potential on the first transistor and turning the first transistor on thereby turning the third transistor on, the flow of current through the third transistor causing the collector thereof to approach the potential of the common circuit point which through the second rectifier changes the potential on the base of the second transistor in a manner which cuts the second transistor off and thereby cuts the fourth transistor off thereby causing the multivibrator to assume its first stable state, a pulse of predetermined polarity thereafter applied to the second rectifier means while the second transistor is off varying the base potential on the second transistor and turning the second transistor on thereby turning the fourth transistor on, the flow of current through the fourth transistor causing the collector thereof to approach the potential of the common circuit point which through the first rectifier changes the potential on the base of the first transistor in a manner which cuts the first transistor off and thereby cuts the third transistor off thereby causing the multivibrator to assume its second stable state, the circuit means and energizing means providing that reverse biasing potentials are applied to the first and second rectifier means while the first and second transistors respectively are on.

14. A bistable multivibrator comprising, in combination, first, second, third, and fourth transistors each having a base, collector, and emitter, the multivibrator having a first stable state while the first and third transistors are on and the second and fourth transistors are off, the multivibrator having a second stable state while the second and fourth transistors are on and the first and third transistors are off, circuit means including energizing means for all the transistors, the emitters of the third and fourth transistors being connected to a common circuit point, a first load connected from the emitter of the first transistor to said common circuit point, a second load connected from the emitter of the second transistor to said common circuit point, a first diode connecting the base of the first transistor to the collector of the fourth transistor, a second diode connecting the base of the second transistor to the collector of the third transistor, first rectifier means including a first pair of rectifiers separately connected to the base of the first transistor, both rectifiers of said first pair of rectifiers having a predetermined polarity with respect to the polarity of the first diode whereby a pulse passing through one of the first pair of rectifiers is blocked by the first diode, second rectifier means including a second pair of rectifiers separately connected to the base of the second transistor, both rectifiers of said second pair of rectifiers having a predetermined polarity with respect to the polarity of the second diode whereby a pulse passing through one of the second pair of rectifiers is blocked by the second diode, other circuit means connecting the first transistor to the third transistor whereby when the first transistor is turned on a transient is applied through said other circuit means to the third transistor in a manner to turn the third transistor on, and additional circuit means connecting the second transistor to the fourth transistor whereby when the second transistor is turned on a transient is applied through said additional circuit means to the fourth transistor to turn the fourth transistor on, a pulse of predetermined polarity applied to the first rectifier means while the first transistor is off varying the base potential on the first transistor and turning the first transistor on thereby turning the third transistor on, the flow of current through the third transistor causing the collector thereof to approach the potential of the common circuit point which through the second diode changes the potential on the base of the second transistor in a manner which cuts the second transistor off and thereby cuts the fourth transistor off thereby causing the multivibrator to assume its first stable state, a pulse of predetermined polarity thereafter applied to the second rectifier means while the second transistor is off varying the base potential on the second transistor and turning the second transistor on thereby turning the fourth transistor on, the flow of current through the fourth transistor causing the collector thereof to approach the potential of the common circuit point which through the first diode changes the potential on the base of the first transistor in a manner which cuts the first transistor off and thereby cuts the third transistor off thereby causing the multivibrator to assume its second stable state.

References Cited in the file of this patent

UNITED STATES PATENTS

| | | |
|---|---|---|
| 2,874,315 | Reichert | Feb. 17, 1959 |
| 2,906,894 | Harris | Sept. 29, 1959 |
| 2,909,678 | Jensen | Oct. 20, 1959 |
| 2,971,157 | Harper | Feb. 7, 1961 |

FOREIGN PATENTS

| | | |
|---|---|---|
| 789,412 | Great Britain | Jan. 22, 1958 |

OTHER REFERENCES

"Microalloy Transistor for Very High Switching Speeds," by Angell, published in Electronics Industries, December 1956, pages 38, 39, 123–126, (FIG. 6 relied on).

Epsco Component, FF–2E, described in Bulletin TDC–102, July 1958, Epsco Components, 108 Cummington St., Boston 15, Mass.

Digital Computer Component and Circuits, by Richards, published by Van Nostrand Co., N.Y., 1957.